United States Patent Office 3,174,962
Patented Mar. 23, 1965

3,174,962
N,N-DIMETHYL-D-GLUCOSAMINE TETRAACETYL
Charles Joseph Morel, Arlesheim, and Rolf René Bader, Riehen, near Basel, Switzerland, assignors to Geigy Chemical Corporation, Ardsley, N.Y., a corporation of Delaware
No Drawing. Filed Nov. 18, 1960, Ser. No. 70,123
Claims priority, application Switzerland, Nov. 19, 1959, 80,776
1 Claim. (Cl. 260—211)

The present invention concerns a process for the production of a new amino sugar as well as the compound obtainable by this process which is a valuable intermediate product.

Already in 1946, N-methyl-L-glucosamine was determined as cleavage product of streptomycin by F. A. Kuehl, E. H. Flynn, F. W. Holly, R. Mozingo and K. Folkers, J. Am. Chem. Soc. 68, 536 and 69, 3032, and since then in the last few years amino sugars, and in particular, those dimethylated in the amino group, have been determined as components of a whole series of antibiotics. The following summary covers the work done in this field but no claim as to its completeness is made:

Paramomycin contains D-glucosamine (J. Am. Chem. Soc. 81, 3480 (1959));
Puromycin contains 3-amino-D-ribose (J. Am. Chem. Soc. 80, 2736 (1958));
Streptothricin contains D-gulosamine (J. Am. Chem. Soc. 78, 4817 (1956));
Kanamycin contains 6-desoxy-6-amino-D-glucose and 3-desoxy-3-amino-D-glucose (J. Am. Chem. Soc. 80, 2342, 4741 (1958));
Erythromycin (Picromycin) contains picrocine, a 3,6-didesoxy-3-dimethylamino-hexose (Naturwissensch. 42, 155 (1955), Antibiotics and Chemother. 3, 663 (1953));
Magnamycin contains mycaminose, a 3,6-didesoxy-3-dimethylaminohexose (J. Am. Chem. Soc. 77, 3353 (1955)) and Amicetin contains a 3,4-didesoxy-3-dimethylamino-hexose (J. Am. Chem. Soc. 78, 6212 (1956)).

Thus, the N,N-dialkylated amino sugars are a very interesting class of substances both for the synthesis of antibiotics as well as for the production of other biologically active compounds. However, up to now it has not been possible to synthesise a member of this class of substances from more easily accessible starting materials.

It has now been found that 1,3,4,6-tetraacetyl-N,N-dimethyl-D-glucosamine (1,3,4,6-tetraacetyl-2-desoxy-2-dimethylamino-D-glucose) which has not been known up to now and, from this, the also new N,N-dimethyl-D-glucosamine (2-desoxy-2-dimethylamino-D-glucose) of the formula

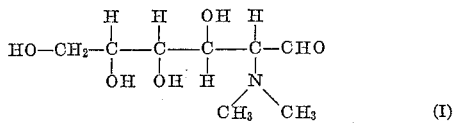

(I)

can be produced from a suitably substituted derivative of D-glucosamine, namely 1,3,4,6-tetraacetyl-D-glucosamine (Ber. 64B, 975 (1931)) by reacting this compound in the presence of a hydrogenation catalyst in an inert solvent at substantially room temperature, with formaldehyde and hydrogen and isolating the 1,3,4,6-tetraacetyl-N,N-dimethyl-D-glucosamine formed as hydrogenation product either as such or in the form of the salt, or if desired, hydrolysing the hydrogenation product by treatment with an inorganic or organic acid to form N,N-dimethyl-D-glucosamine and isolating this, preferably as the salt. It is very surprising that the methylation according to the invention can be performed in view of the properties of the starting material and the reaction conditions necessary. In this methylation, the 1,3,4,6-tetraacetyl-D-glucosamine must be in the form of the free base in, advantageously, alcoholic solution. However, rearrangements involving migration of an acyl radical from an oxygen atom to the nitrogen atom have already been observed in derivatives of glucosamine which appeared to be much more stable, such as glycosides or compounds with a single acyl radical. Thus it is known, for example, from Ber. 89, 701 (1959) that with β-ethyl-3,4,6-triacetyl-D-glucosaminide the 3-acetyl radical migrates to the amino group when the compound is left to stand as 3% solution in ethanol. Further, according to Ber. 90, 2054 (1957) it has been determined that on hydrogenating 1-α-acetyl-N-carbobenzyloxy-3,4,6-trimethyl-D-glucosamine in ethyl acetate in order to split off the carbobenzyloxy group, due to the migration of the acetyl group to the amino group, 3,4,6-trimethyl-N-acetyl-D-glucosamine is obtained as sole reaction product.

The methylation can be performed, for example, by dissolving 1,3,4,6-tetraacetyl-D-glucosamine in the cold in a solvent, e.g. in ethanol, then adding the calculated amount or a slight excess of, e.g. aqueous formaldehyde solution corresponding to 2 to about 2.2 mol of formaldehyde per 1 mol of 1,3,4,6-tetraacetyl-D-glucosamine and simultaneously adding the catalyst. Examples of catalysts are Raney nickel, platinum oxide and palladium, the two latter also with a carrier such as charcoal, barium sulphate or barium carbonate. Preferably palladium/charcoal is used. The hydrogenation is then performed at reduced pressure and room temperature until, for all practical purposes, no more hydrogen is taken up. After removal of the catalyst, the calculated amount of a, for example, ethanolic solution of an inorganic or organic acid, e.g. of hydrochloric acid, hydrobromic acid, sulphuric acid, oxalic acid or maleic acid is added to the reaction solution which is then evaporated to dryness in the vacuum at a low temperature. The salt of 1,3,4,6-tetraacetyl-N,N-dimethyl-D-glucosamine which remains is recrystallised from a suitable solvent, e.g. from ethanol. If desired, the salts of N-N-dimethyl-D-glucosamine are obtained by hydrolysis by means of a dilute acid such as an aqueous mineral acid of low normality, e.g. 0.5–3 N-hydrochloric acid in the warm and evaporation of the solution in vacuo.

The following example further describes the process according to the invention. Parts are given therein as parts by weight and their relationship to parts by volume is as that of grammes to cubic centimetres. The temperatures are in degrees centigrade.

*Example*

13.5 parts of 1,3,4,6-tetraacetyl-D-glucosamine (Ber. 64B 975 (1931)) are dissolved at room temperature in 1800 parts by volume of ethanol, 13.9 parts of aqueous formaldehyde solution (37.1% content) are added and the whole is hydrogenated at low pressure with the addition of 5 parts of palladium charcoal until it can be determined that no more hydrogen is taken up. (In one case, the duration of the hydrogenation was 5 hours and 40 minutes, the total take up of hydrogen was 1850 parts by volume =104.5% of the theoretical.) The catalyst is then filtered off and 23.7 parts by volume of a 6.0% solution of hydrogen chloride in anhydrous ethanol are added to the filtrate. The alcoholic solution is then evaporated to dryness in the vacuum at 30–35°. The residue is dissolved in hot ethanol, the hot solution is filtered through animal charcoal and allowed to cool, whereupon the hydrochloride of 1,3,4,6-tetraacetyl-N,N-dimethyl-D-glucosamine crystallises out.

M.P.: 180–181° (decomposition, browning after about 170°). $[\alpha]_D^{22°}$: +25.3° [c.=1 in $H_2O$]. $C_{16}H_{26}O_9NCl$ calculated: C, 46.66; H, 6.36; N, 3.40; Cl, 8.61%. Found: C, 46.44; H, 6.18; N, 3.41; Cl, 8.66%.

The base can be liberated from the hydrochloride by dissolving the latter in a little water, adding sodium hydrogen carbonate to the solution and extracting the free base with chloroform. Recrystallized from ether/petroleum ether, the base melts at 93–94°. $C_{16}H_{25}O_9N$ calculated: C, 51.19; H, 6.71; N, 3.73%. Found: C, 50.94; H, 6.67; N, 3.89%.

5 parts of this hydrochloride are refluxed for 2 hours in 50 parts by volume of 1 N-hydrochloric acid. The hot solution is then filtered through animal charcoal and the filtrate is evaporated to dryness in the vacuum at 40–45°. The residue is recrystallised from anhydrous ethanol whereupon N,N-dimethyl-D-glucosamine hydrochloride is obtained. M.P.: 164–166° (decomposition, browning after about 150°). $C_8H_{18}O_5NCl$ calculated: C, 39.43; H, 7.45; N, 5.75; Cl, 14.55%. Found: C, 39.42; H, 7.23; N, 5.86; Cl, 14.48%. $[\alpha]_D^{25}$: +51.1° (final value), (c.=0.75 in $H_2O$).

The new compounds obtained according to the invention are valuable intermediate products both for the synthesis of antibiotics and other pharmaceuticals. For example, N,N-dimethyl-D-glucosamine can be converted analogously to glucosamine (see, e.g. J. C. Irvine, D. McNicoll and A. Hynd, J. Chem. Soc., 1911, 250) by means of acetylbromide into α-bromo-3,4,6-triacetyl-N,N-dimethylglucosamine hydrobromide which can be reacted, for example with suitable phenols, to form physiologically active compounds. Thus for example, by reacting with the sodium salt of o-benzyl-phenol, 3,4,6-triacetyl-β-(o-benzylphenyl)-N,N-dimethyl - D - pyranoglucosaminide is obtained, which, among other properties, potentiates the activity of anaesthetics, and on treating this compound with ammonia in anhydrous methanol, β-(o-benzylphenyl)-N,N-dimethyl-D-pyranoglucosaminide is obtained which has, in particular, anti-emetic activity. On the other hand, the methohalides, obtained by quaternising 3,4,6-triacetyl - β - (o-benzylphenyl) - N,N - dimethyl - D-pyranoglucosaminide with methyl halides, have hypotensive activity in particular. In addition, methohalides having local anaesthetic activity are obtained by reacting the α-bromo-3,4,6-triacetyl - N,N - dimethyl - D - pyranoglucosamine mentioned above with the sodium salt of 2,6-dimethyl-phenol to form 3,4,6-triacetyl-β-(2',6'-dimethylphenyl)-N,N-dimethyl-D-pyranolglucosaminide and then quaternising the reaction product with methyl halides.

What we claim is:

1,3,4,6-tetraacetyl-N,N-dimethyl-D-glucosamine.

References Cited in the file of this patent

UNITED STATES PATENTS

| 2,463,885 | Kuehl et al. | Mar. 8, 1949 |
| 2,884,411 | Heyns | Apr. 28, 1959 |
| 2,918,462 | Druey et al. | Dec. 22, 1959 |

OTHER REFERENCES

Vargha et al.: "J. Chem. Soc.," 1957, pages 805–812.

Gilman: "Organic Chemistry," volume II, 1943, page 1189, John Wiley and Sons Inc., New York, New York.

Pigman: The Carbohydrates, 1957, pages 410–412, Academic Press Inc., New York.